May 9, 1950     R. O. FERGUSON     2,506,864
ROTATABLE CONTAINER AND SUPPORTING MEANS THEREFOR
Filed Aug. 27, 1945
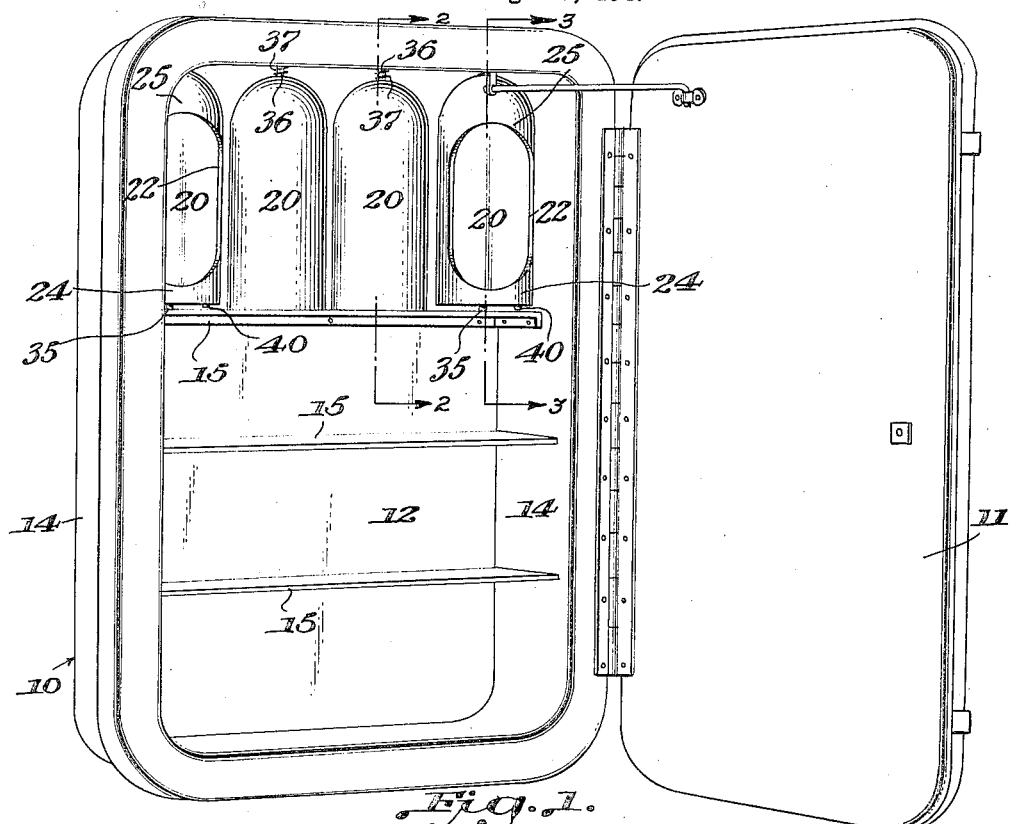
*Fig. 1.*
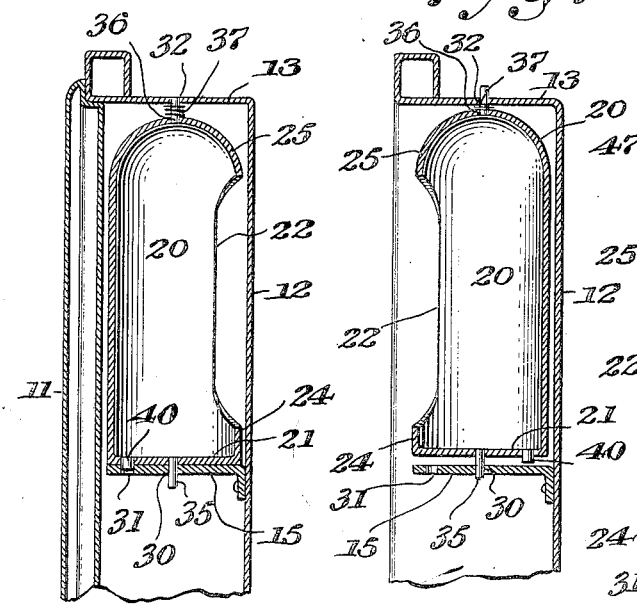
*Fig. 2.*     *Fig. 3.*     *Fig. 4.*
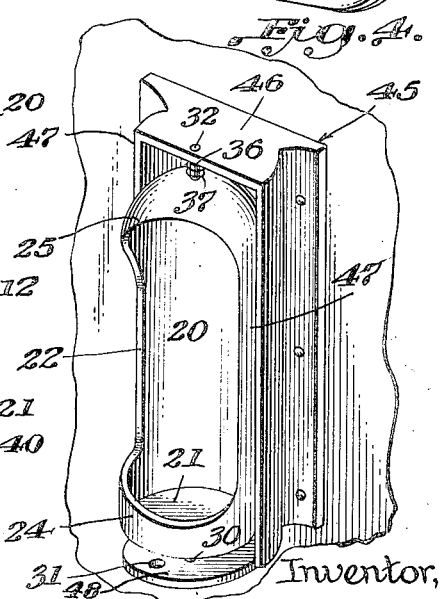
Inventor,
Robert O. Ferguson,
By Mason & Halfald
Attys.

Patented May 9, 1950

2,506,864

UNITED STATES PATENT OFFICE 2,506,864

ROTATABLE CONTAINER AND SUPPORTING MEANS THEREFOR

Robert O. Ferguson, Bristol, Tenn.

Application August 27, 1945, Serial No. 612,730

7 Claims. (Cl. 312—148)

1

This invention relates to a container and more particularly to a household article for storing substances so that the substances may be stored for safekeeping.

An object of the invention is to provide a housing for poisonous or other substances wherein access cannot be obtained thereto except through a comparatively difficult, deliberate overt act.

Another object of the invention is to provide a container for housing substances which may be conveniently combined with a bathroom medicine cabinet.

Another object of the invention is to provide a container for housing substances which may be mounted upon a wall bracket or the like and conveniently placed in a bathroom, kitchen or basement.

Still another object of the invention is to provide a container for housing poisonous substances which may be conveniently combined with a bathroom medicine cabinet or may be mounted upon a wall bracket or the like and conveniently placed in a bathroom, kitchen or basement wherein the container and support therefor forms a simple inexpensive structure.

Referring now to the drawings wherein the preferred form of my invention is illustrated, Figure 1 is a perspective view of a medicine cabinet in combination with the container, showing the container in open and closed positions.

Figure 2 is a sectional view taken on line 2—2 of Figure 1 showing the container in its closed and latched position and a door of the cabinet in its closed position.

Figure 3 is a sectional view taken on line 3—3 of Figure 1, showing the container in its open unlatched position.

Figure 4 is a perspective view of a modified form of the invention wherein the container is mounted in a wall bracket, the container being shown in its open unlatched position.

Reference numeral 10 generally indicates a medicine cabinet of usual construction having a hinged door 11, back wall 12, top wall 13 and side walls 14. The customary shelves 15 are secured within the cabinet 10 in the usual manner.

The container 20 is preferably of cylindrical shape with the exception of its top portion which is of spherical shape and has a flat disc-shaped bottom wall 21. The container 20 has a cut-out portion 22 so as to form an elongated opening therein, as clearly illustrated in the drawings. The cut-out portion 22 is preferably formed so as to leave a lower ledge 24 and an upper ledge 25. By so forming the opening 22 in the container

2

20, one must lift the bottle or jar containing the poisonous substance through the opening 22 for reasons to be hereinafter explained.

As shown in Figures 1, 2 and 3, the container 20 is mounted in the medicine cabinet 10 between the top wall 13 and the upper shelf 15 thereof. It is preferable to mount the container 20 at the uppermost portion of the medicine cabinet so as to be out of a child's reach as much as possible. Accordingly the upper shelf 15 is provided with an opening 30 positioned substantially midway between the front and back of the shelf and another opening 31 axially offset from the opening 30. The top wall 13 of the cabinet 10 is provided with an opening 32 which is axially aligned with opening 30 in the bottom shelf 15. The container 20 is provided with a pin 35 which is secured to the bottom wall 21 of the container 20 and extends downwardly beyond the bottom wall so as to be insertable through the opening 30 of the shelf 15. A similar pin 36 is secured to the upper wall of the container 20 and extends upwardly therebeyond so as to be insertable through the opening 32 formed in the upper wall 13 of the cabinet 10. A coiled spring 37 is positioned between the top wall of the container 20 and the underside of the top wall 13 of the cabinet 10 and surrounds the upper pin 36, the spring 37 functioning to urge the container downwardly. A latching pin 40 is also secured to the bottom wall 21 of the container 20 and extends downwardly a short distance below the bottom wall, the latching pin 40 being adapted to cooperate with the opening 31 within the shelf of the cabinet.

The modification of the invention shown in Figure 4 is similar in all respects to that shown in Figures 1, 2 and 3, except that the container 20 is mounted on a wall bracket generally indicated at 45. The wall bracket 45 is capable of being secured in any suitable manner to a wall, and is provided with a top 46 having an opening 32 therein, arcuately shaped side walls 47 and a bottom disc-shaped wall 48. The bottom wall 48 has an opening 30 therein axially aligned with the opening 32 in the top wall 46 and an opening 31 axially offset from the opening 30. The container 20 is preferably formed of the same shape as that shown in Figures 1, 2 and 3.

Assuming that the container 20 is mounted within the medicine cabinet 10 or wall bracket 45 as illustrated and previously described, the container 20 as shown on either side of the medicine cabinet in Figure 1 or in the wall bracket 45 as shown in Figure 4 is positioned with the cut-out portion 22 away from the rear wall of its support. Thus, access may be had to the container 20 to place a bottle, jar, box or the like containing poisonous substances. After the poisonous substance has been inserted within the container 20, the container is then rotated 180 degrees about its pivot pins 35 and 36 so that the opening 22 faces the rear wall of its support, as shown in Figure 2, and as illustrated by the two central containers in Figure 1. When the container has been thus rotated, the locking pin 40 will register with the opening 31 and thus permit the container 20 to drop by gravity (and aided by the spring 37) so as to assume the position shown in Figure 2. When the container is in this position, access cannot be had to the contents within the same. Thus, an adult groping through the medicine cabinet at night could not mistakenly obtain the poisonous substance. When access to the poisonous substance is desired, it is necessary to perform the overt act of physically raising the container 20 against the combined action of the spring 37 and weight of the container and substance housed therein to lift the locking pin 40 out of the opening 31. Thereafter, and while the container is raised, the same must be rotated 180 degrees so as to assume its open position as aforementioned. In this manner, and in this manner only, can access be had to the container. Also, it is conceivable that one might carelessly leave the container in its open position. If such a situation existed, one could determine by the sense of touch that they were contacting the poisonous container because it would be necessary to lift the bottle, jar, or the like housing the poisonous substance above the lower ledge 24, thus requiring an overt act.

In the case of children, it is a well known fact that they are extremely dexterous in climbing and can and do reach an upper shelf of a medicine cabinet. However, under such circumstances they usually have to reach a considerable distance and while they would be able to pull a bottle of poisonous substance off of the upper shelf of the cabinet, they would be unable to exert a lifting force on the container 20, particularly to exert such a lifting force and simultaneously rotate the container. As both overt acts are necessary in order to unlock the container and expose its opening, the likelihood of a child obtaining access to the poisonous substance is negligible.

The modified form of the invention, as shown in Fig. 4, is capable of being mounted on any wall surface and the operation of the same is identical with that as shown in Figures 1, 2 and 3. The arcuate side walls 47 form a housing for the container so that access may not be had to the opening 22 except when the same is opposed to either the rear wall of the container 45 or the wall forming the support for the bracket.

It will be obvious to those skilled in the art that the invention may take many other forms and the protection afforded to this invention is not to be limited except as defined in the appended claims. Also, it will be understood that the container may be mounted between shelves of a medicine cabinet or between the bottom wall of the medicine cabinet and the lower shelf. Accordingly, it will be understood that the terms used in the claims are to be construed in their generic sense. Specifically, the term "wall" has been used to define any suitable type of support such as the shelf 15.

I claim:

1. In combination, a container and a support therefor; said support having spaced bottom and top walls and a back wall, a hole in said bottom wall; said container having bottom and side walls and an opening in a side wall, said container having a height less than the distance between said top and bottom walls of said support, said container being positioned between said top and bottom walls of said support; means supporting said container for permitting rotation and vertical sliding thereof to position said opening therein opposed and adjacent to the back wall of said support, and a latching pin projecting downwardly from the bottom of said container cooperating with said hole in said bottom wall of said support for releasably latching said container when the opening therein is positioned adjacent the back wall of said support.

2. In combination, a container adapted to house poisonous substances and the like within a medicine cabinet; said medicine cabinet having a back wall and a shelf therein and a pair of spaced holes in said shelf; said container having a bottom wall and a substantially cylindrical side wall, said side wall having a cut out portion therein forming an opening to provide access to said container; a pivot pin secured to the bottom wall of said container and extending through one of said holes in the shelf of said medicine cabinet for permitting rotation and limited vertical movement of said container relative to said medicine cabinet to expose the opening in said container; a latching pin secured to the bottom wall of said container and extending therebeyond, said latching pin cooperating with the other of said holes in said shelf to releasably latch said container against rotation when the opening therein is facing the back wall of said medicine cabinet, thereby preventing access to said container.

3. In combination, a container and a support therefor; said support having spaced apart top and bottom walls and a back wall, a pair of holes in said bottom wall and a hole in said top wall; said container having a top and a bottom wall and a substantially cylindrical side wall, a cut out portion in said cylindrical side wall to form an opening therefor, said container having a height less than the distance between said top and bottom walls of said support, said container being positioned between said top and bottom walls of said support; pivot pins secured to the top and bottom walls of said container and extending within one of said holes in the bottom wall of said support and the hole in the top wall of said support thereby permitting rotation of said container relative to said support and limited vertical movement thereof for exposing the opening within said container; a latching pin secured to the under side of the bottom wall of said container cooperating with the other hole in the bottom wall of said support for releasably latching said container against rotation when the opening therein is facing the back wall of said support, and a spring surrounding the upper pivot pin and positioned between the top wall of said container and the top wall of said support for resiliently urging the container downwardly.

4. A medicine cabinet having a top wall, back wall and a shelf extending outwardly from the back wall in substantially parallel relation with the top wall, a hole in the top wall and a hole in the shelf aligned with the hole in the top wall, a second hole in said shelf offset from the first mentioned hole, a container mounted between the top wall and shelf of said medicine cabinet, said container having top and bottom walls and a substantially cylindrical side wall, a cut out portion in said side wall forming an opening therein, pivot pins secured to the top and bottom walls of said container and extending through the axially aligned holes in the top wall and shelf of said medicine cabinet for permitting rotation of said container relative to said medicine cabinet, a latching pin secured to the bottom wall of said container and extending therebeyond, said latching pin cooperating with the other hole in said shelf for latching the container against rotation when the opening therein is facing the back wall of said medicine cabinet.

5. A medicine cabinet having a top wall, back wall and a shelf extending outwardly from the back wall in substantially parallel relation with the top wall, a hole in the top wall and a hole in the shelf aligned with the hole in the top wall, a second hole in said shelf offset from the first mentioned hole in said shelf, a container mounted between the top wall and shelf of said medicine cabinet, said container having top and bottom walls and a substantially cylindrical side wall, a cut out portion in said side wall forming an opening therein, pivot pins secured to the top and bottom walls of said container and extending through the axially aligned holes in the top wall and shelf of said medicine cabinet for permitting rotation and limited vertical movement of said container relative to said medicine cabinet, a latching pin secured to the bottom wall of said container and extending therebeyond, said latching pin cooperating with the other hole in said shelf for latching the container against rotation when the opening therein is facing the back wall of said medicine cabinet, and a spring positioned between the under side of the top wall of said medicine cabinet and the outer side of the top wall of said container for urging the container downwardly against said shelf.

6. In combination, a wall bracket and a container, said wall bracket having a top wall, a bottom wall and curved side walls, a hole in said top wall and a hole in said bottom wall axially aligned with the hole in said top wall, a second hole in said bottom wall; a container mounted between said top, bottom and side walls of said wall bracket, said container having a bottom wall, top wall and a substantially cylindrical side wall, a cut out portion in said side wall forming an opening therein, pivot pins secured to the top and bottom walls of said container and extending through the axially aligned openings in the top and bottom walls of said bracket thereby permitting rotation of said container relative to said bracket, a latching pin secured to the under side of the bottom wall of said container cooperating with said second opening in the bottom wall of said wall bracket for preventing rotation of said container relative to said wall bracket when the opening in said container is unexposed, said container adapted to be raised relative to said bottom wall of said bracket for unlatching said latching pin, and resilient means positioned between the top wall of said bracket and the top wall of said container for urging the container downwardly against the bottom wall of said bracket.

7. In combination, a container and a support therefor, said support comprising a rear wall and a shelf having a hole therein, said container comprising a bottom wall having a latching pin secured to the bottom thereof and a substantially cylindrical side wall having an opening therein, means for rotating and for permitting limited vertical movement of said container relative to said support to expose said opening to provide access to said container and to position said opening in front of said back wall to prevent access to said container, said latching pin cooperating with said hole for releasably latching said container against rotation when in its inaccessible position.

ROBERT O. FERGUSON.

REFERENCES CITED

The following references are of record in the file of this patent:

UNITED STATES PATENTS

| Number | Name | Date |
|---|---|---|
| 398,604 | Ganter | Feb. 26, 1889 |
| 425,523 | Rosen | Apr. 15, 1890 |
| 941,940 | McCormick | Nov. 30, 1909 |
| 1,226,301 | Brexendorf | May 15, 1917 |
| 1,813,659 | Carlson | July 7, 1931 |
| 1,882,345 | Upham | Oct. 11, 1932 |
| 2,199,731 | Pryne | May 7, 1940 |